United States Patent [19]

Ruddy

[11] Patent Number: 4,737,234

[45] Date of Patent: Apr. 12, 1988

[54] METHOD AND APPARATUS FOR PERMANENTLY RECORDING HIGH NEUTRON FLUENCE

[75] Inventor: Francis H. Ruddy, Monroeville, Pa.

[73] Assignee: Westinghouse Electric Corp., Pittsburgh, Pa.

[21] Appl. No.: 897,553

[22] Filed: Aug. 18, 1986

[51] Int. Cl.$^4$ .................. B44C 1/22; C03C 15/00; C03C 25/06

[52] U.S. Cl. .................. 156/626; 156/628; 156/643; 156/644; 156/651; 156/655; 250/492.1; 250/518.1

[58] Field of Search ............... 156/626, 628, 644, 643, 156/651, 654, 655; 250/492.1–492.3, 518.1, 522.1

[56] References Cited

U.S. PATENT DOCUMENTS

| | | | |
|---|---|---|---|
| 2,479,882 | 8/1949 | Wallhausen et al. | 250/106 |
| 2,975,113 | 3/1961 | Gordon | 204/154.2 |
| 3,000,697 | 9/1961 | Wahl | 23/14.5 |
| 3,123,511 | 3/1964 | Coleman | 250/492.1 X |
| 3,239,667 | 3/1966 | Roberts et al. | 250/492.1 |
| 3,280,329 | 10/1966 | Harmer et al. | 250/492.1 X |
| 3,372,275 | 3/1968 | Kocher | 250/518.1 X |
| 3,496,362 | 2/1970 | Kirkpatrick et al. | 250/492.1 X |
| 3,612,871 | 10/1971 | Crawford et al. | 156/643 X |
| 3,915,757 | 10/1975 | Engel | 148/6 |
| 4,530,734 | 7/1985 | Klima | 156/628 |
| 4,613,758 | 9/1986 | Ing et al. | 250/474.1 |

FOREIGN PATENT DOCUMENTS 1444719  8/1976  United Kingdom ............. 250/472.1

OTHER PUBLICATIONS

Frank H. Ruddy et al., "Standardized Physics-Dosimetry for U.S. Pressure Vessel Cavity Surveillance Programs," Fifth International *ASTM-Euratom Symposium on Reactor Dosimetry*, Geesthacht, HEDL-SA-3095, Sep. 1984.

A Sensitive Fast Neutron Monitor Using Fission-Foil Lexan Detectors, pp. 102–104, Health Physics, Pergamon Press 1974, vol. 26, No. 1 (1974), Printed in Northern Ireland; Rago et al.

Alpha Radiography With Plastic Track Dectectors, pp. 289–299, International Journal of Applied Radiation and Isotopes (1971), vol. 22, Pregamon Press, Somogyi et al.

*Primary Examiner*—William A. Powell
*Attorney, Agent, or Firm*—D. C. Abeles

[57] ABSTRACT

A method and apparatus are described for producing a high fluence neutron dosimeter which serves as a permanent record for fission rate measurement. An alpha-emitting source which is a radioactive parent of the daughter isotope of interest is used to implant recoil ions resulting from alpha decay into a substrate such as a mica solid state track recorder. The source and the mica solid state track recorder are arranged in spaced, opposing relation in an assembly housed in a vacuum. For example, a $^{241}$Am source in thin layer form can be placed next to the mica solid state track recorder. Each alpha decay of $^{241}$Am results in a $^{237}$Np ion with enough recoil energy to be implanted in the solid state track recorder. An ion-implanted mica solid state track recorder so produced is then exposed to neutrons, etched, and both the induced fission tracks and recoil ion tracks are counted. As a result, the fission rate in fissions per atom can be calculated.

19 Claims, 1 Drawing Sheet

U.S. Patent      Apr. 12, 1988      4,737,234
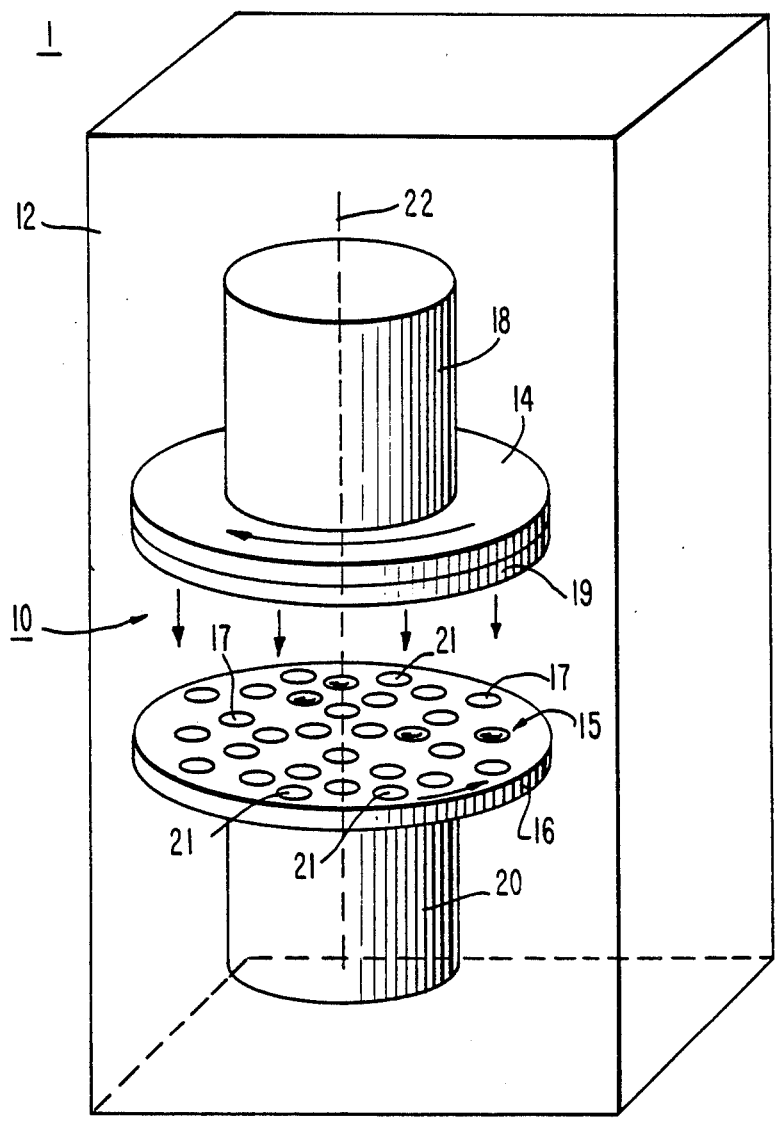

METHOD AND APPARATUS FOR PERMANENTLY RECORDING HIGH NEUTRON FLUENCE

BACKGROUND OF THE INVENTION

The invention relates to a method and apparatus for producing fissionable deposites for reactor dosimetry and, more particularly, to a method and apparatus for producing fissionable deposits of ultralow mass on a substrate to serve as a dosimeter with a permanent record of high neutron fluence.

Ultralow-mass fissionable deposits have proved useful as fissioning sources for solid state track recorder fission rate measurements in high intensity neutron fields. These fission rate measurements are used to derive information for neutron dosimetry purposes.

A solid state track recorder placed adjacent to a fissionable deposit records tracks from the recoiling fission fragments which result from the fissions in the deposit. If the fissionable deposit is sufficiently thin, the effects of self-absorption can be ignored. The number of these tracks observed with an optical microscope after chemical etching of the solid state track recorder is proportional to the number of fissions that has occurred in the fissionable deposit, which is proportional to the fission rate per atom of the fissionable deposit and the fluence of the neutron field, given by the integration of the neutron flux over the period of exposure. Thus, the number of fission fragment tracks per square centimeter, i.e., the track density, in the solid state track recorder can be used to calculate the fission rate per unit area in the fissionable deposit.

For typical high neutron fluence applications, such as reactor core dosimetry or reactor component dosimetry, it has been found that a limitation is placed on using solid state track recorders due to the maximum track density that can be used, usually about $10^6$ tracks/cm$^2$, without excessive track overlap. In order to avoid excessively high track densities, low-mass fissionable deposits can be used to reduce the number of fissions that will occur at a given neutron fluence.

For example, in dosimetry applications for light water reactor pressure vessel surveillance, $^{235}$U deposits with masses as low as $1.5 \times 10^{-13}$ gram are required to produce a usable track density in a solid state track recorder. Similarly, low masses of other isotopes, such as $^{237}$Np, $^{238}$U and $^{239}$Pu, are required for dosimetry in light water reactor pressure vessel surveillance.

It has been found that the technical problems associated with the production of such low-mass deposits can be overcome by using radioisotopic spiking/electroplating techniques to characterize the masses of these ultralow-mass fissionable deposits. For example, ultralow-mass deposits can be produced by an electroplating technique using, e.g., $^{237}$U (7 day half-life) as an isotopic spike for $^{235}$U and $^{238}$U, $^{239}$Np (2.4 day half-life) as a spike for $^{237}$Np, and $^{236}$Pu (1.85 y half-life) as a spike for $^{239}$Pu. These electroplating procedures have inherent limitations, however, due to radioisotopic spike limitations, such as chemical impurities, etc. which lead to minimum masses of each isotope that can be produced and still give a meaningful signal above background in a neutron field.

Extension of deposit fabrication techniques to lower masses is described in co-owned and co-pending U.S. application Ser. No. 897,466, filed Aug. 18, 1986, entitled METHOD AND APPARATUS FOR PRODUCING ULTRALOW-MASS FISSIONABLE DEPOSITS FOR REACTOR NEUTRON DOSIMETRY BY RECOIL ION-IMPLANTATION. The recoil ion-implanation techniques described therein use an alpha emitting source which is a radioactive parent of the isotope of interest to implant recoil ions resulting from alpha decay into a suitable substrate. For example, an $^{241}$Am source in thin layer form is placed next to a substrate layer in a vacuum. Each alpha decay of $^{241}$Am results in a $^{237}$Np ion with enough recoil energy to be implanted in the substrate. As described therein, fission deposits with masses appropriate for high neutron fluence dosimetry are thus prepared.

In order to accurately determine the fission rate of a solid state track recorder neutron dosimeter produced according to the recoil ion-implantation techniques described in the referenced application, both the number of fissions that has occurred and the mass of the fissionable deposit must be determined to high accuracy. The former is simply determined from the number of fission tracks formed in the solid state track recorder. The latter requires careful and time-consuming mass calibration measurements on the fissionable deposit. Once calibrated, detailed records of the mass calibration must be maintained to ensure that the fission rate of the solid state track recorder neutron dosimeter can be calculated after exposure. These mass calibrations are usually done radiometrically, requiring accurate determinations of the uncertainties due to isotope half life, radiation branching ratios, detector efficiency, etc.

In light of the above, a method and apparatus are desired for producing ultralow-mass fissionable deposits which serve as a dosimeter with a permanent record of high neutron fluence.

SUMMARY OF THE INVENTION

Accordingly, it is an object of the present invention to provide a method and apparatus for producing a high fluence neutron dosimeter capable of eliminating the need for isotopic spike procedures.

It is another object of the present invention to provide a method and apparatus for producing a high fluence neutron dosimeter capable of eliminating the need for electroplating techniques and the related high purity chemical requirements.

It is another object of the present invention to provide a method and apparatus for producing a high fluence neutron dosimeter capable of producing highly uniform deposits previously unavailable through electroplating methods.

It is another object of the present invention to provide a method and apparatus for producing a high fluence neutron dosimeter wherein only the apparatus need be calibrated.

It is another object of the present invention to provide a method and apparatus for producing a high fluence neutron dosimeter wherein the masses of the fissionable deposits produced can be controlled precisely.

It is another object of the present invention to provide a method and apparatus for producing a high fluence neutron dosimeter wherein the resulting material in the fissionable deposit is isotopically pure.

It is another object of the present invention to provide a method and apparatus for producing a high fluence neutron dosimeter capable of producing fissionable deposits of extremely low masses on solid state track recorders.

Finally, it is an object of the present invention to provide an apparatus and method for producing a high fluence neutron dosimeter using a solid state track recorder which results in a permanent record of data for determining fission rate per atom of the fissionable deposit, of the number of implanted ions of the fissionable deposit, of the neutron fluence, etc. for various applications.

To achieve the foregoing and other objects of the present invention, and in accordance with the purposes of the invention, there is provided a method and apparatus for producing ultralow-mass fissionable deposits on a substrate to serve, after etching, as a dosimeter with a permanent record for fission rate and neutron fluence measurement. According to this invention, an alpha-emitting source, which is a radioactive parent of the daughter isotope of interest, is used to implant recoil ions resulting from alpha decay into a substrate, such as a mica solid state track recorder, which is part of an assembly which receives in spaced opposing relation the source and the solid state track recorder. For example, a $^{241}$Am mica source in thin layer form can be placed next to the mica solid state track recorder in a vacuum housing the assembly. Each alpha decay of $^{241}$Am results in a $^{237}$Np ion with enough recoil energy to be implanted in the solid state track recorder. If an ion-implanted mica solid state track recorder produced by this method is then exposed to neutrons, etched, and both the induced fission tracks and recoil ion tracks are counted, the fission rate in fissions per atom can be calculated.

BRIEF DESCRIPTION OF THE DRAWING

The accompanying drawing, which is incorporated in and constitutes a part of the specification, illustrates an embodiment of the invention, and together with the description, serves to explain the principles of the invention.

FIG. 1 is a schematic view of the apparatus according to the present invention for producing ultralow-mass fissionable deposits by recoil ion-implantation.

DETAILED DESCRIPTION OF THE PREFERRED EMBODIMENTS

The present invention is a new and simpler mass calibration method which also provides a permanent record of the deposit mass as well as of the number of fissions which has occurred in the deposit.

Although the following description discusses in detail the implantation of ions into a solid state track recorder via alpha recoil ion implantation, other methods for implanting ions are available, e.g., using a particle accelerator to accelerate an ion and drive it into a substrate. These alternate methods are also contemplated by the present invention.

The preferred embodiments according to the present invention will now be described.

The method for producing $^{235}$U and the apparatus used therewith are described first. $^{235}$U is produced by the decay of $^{239}$Pu according to the following Equation (1):

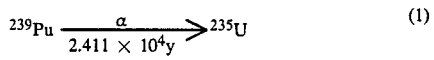

$$^{239}\text{Pu} \xrightarrow[2.411 \times 10^4 y]{\alpha} {}^{235}\text{U} \qquad (1)$$

The alpha ($\alpha$) particles emitted by $^{239}$Pu have an energy of 5.16 MeV. Conservation of momentum dictates that:

$$(\alpha\text{Energy})(\alpha\text{Mass}) = (\text{Recoil Energy})(\text{Recoil Mass}) \qquad (2)$$

Using Equation 2:

$$\text{Recoil Energy} = (4/235)(5.16 \text{ MeV}) \qquad (3)$$

$$= 8.78 \times 10^{-2} \text{ MeV} \qquad (4)$$

$$= 87.8 \text{ keV} \qquad (5)$$

As a result, each $^{239}$Pu decay yields a 5.16 MeV alpha particle accompanied by an 87.8 keV $^{235}$U recoil.

If a thin deposit of $^{239}$Pu is placed in a vacuum, about 50% of the decays thereof will result in a $^{235}$U alpha recoil into the vacuum. If a suitable substrate is placed in the vacuum adjacent to the $^{239}$Pu source, recoil $^{235}$U ions will be implanted in the surface of the substrate resulting in an ultra low-mass deposit of $^{235}$U.

By using an extrapolation of the range-energy tables found in "Range and Stopping Power Tables for Heavy Ions," L. C. Northcliffe and R. F. Schilling, Nuclear Data Tables, A7, 233–463 (1970), the recoil range of 87.8 KeV $^{235}$U ions is estimated to be about 10 $\mu$g/cm$^2$. Thus, a 10 $\mu$g/cm$^2$ layer of $^{239}$Pu would retain about 50% of its recoils, so that an effective maximum thickness of a $^{239}$Pu layer can be about 5 $\mu$g/cm$^2$. Accordingly, for a 10 cm diameter layer of $^{239}$Pu with a thickness greater than the range of $^{235}$U recoils, the number of $^{235}$U recoils that would escape from the $^{235}$Pu layer is:

$$\frac{\pi(5\text{cm}^2)(5 \times 10^{-6} \text{ g/cm}^2)(6.022 \times 10^{23} \text{ atoms/mole})}{(235 \text{ g/mole})} \times$$

$$\frac{(0.693)}{(2.411 \times 10^4)(365.23)(24)(3600)} (\sec^{-1})$$

$$= 9.17 \times 10^5 \text{ ions/sec} \qquad (6)$$

$$= 7.92 \times 10^{10} \text{ ions/day} \qquad (7)$$

For a substrate at a distance of 5 cm from this $^{235}$Pu source, roughly $2.5 \times 10^8$ $^{235}$U ions/cm$^2$/day would be implanted.

The mass requirement for a $^{235}$U mid-plane reactor cavity solid state track recorder neutron dosimeter is $1.5 \times 10^{13}$ gram. This deposit is typically spread over an area with a diameter of ¼ in. The resulting atomic density of the deposit is $1.21 \times 10^9$ atoms/cm$^2$ of $^{235}$U. The time required to produce a deposit with this thickness is:

$$\frac{1.21 \times 10^9 \text{ atoms/cm}^2}{2.5 \times 10^8 \text{ ions/cm}^2/\text{day}} = 4.8 \text{ days} \qquad (8)$$

Solid state track recorder neutron dosimeters typically have an overall diameter of 1.1 cm. As a result, about 25-50 solid state track recorders could be simultaneously irradiated adjacent to a 10 cm diameter $^{235}$Pu source. An apparatus such as shown in FIG. 1 and referred to generally by reference numeral 1, which will now be described, is used.

The apparatus 1 includes an assembly 10 enclosed in a vacuum chamber 12. The assembly 10 has a disk 14 opposing a disk 16, with a separation of about 5 cm therebetween. The disk 14 and the disk 16 are each about 10 cm in diameter. Preferably, high purity nickel is used as the material of the disk 14. Any other high purity metal, such as stainless steel, can be substituted as long as good adherence characteristics exist between the radioactive parent described below and the material of the disk 14. The bottom surface of the disk 14 is plated with a layer 19 of 10 $\mu$g/cm$^2$ of $^{239}$Pu which is the radioactive parent source. The disk 16 includes thereon facing the layer 19 at least one substrate 15, for example, a plurality of mica, quartz or zircon solid state track recorder wafers 17, each about 1.1 cm in diameter for receiving a dissionable daughter 21 deposit by recoil ion-implanation. Mica is preferred due to its fine etching properties. The disk 14 is rotated about an axis 22 through the center of each disk 14 and 16 via, e.g., a motor 18, to ensure deposit uniformity. Each of the wafers 17 is also rotated about its respective axis relative to the disk 16. This rotation can be accomplished, e.g., by using a set of gears at each individual wafer 17 which is operatively connected to a motor to form a drive means 20. Disk 16 may also rotate via drive means 20. Generally, there should be at least two independent rotations, preferably the source layer 19 and the wafers 17.

It is preferable that the plurality of wafers 17 be loaded in a clean (laminar flow) area prior to rapid insertion into the vacuum chamber 12 which would be located in a glovebox. A glovebox is a container conventionally used to isolate radioactivity eminating from a source therein from the environment.

When put into practice, this new method is simpler and more economical than previous methods. In addition, it has been found that the implanted substrates formed using mica according to the present invention are extremely durable.

About 25 deposits can be made in 5 days, and deposit calibration requirements diminish as the assembly 10 is calibrated. That is, a set of trial experiments can be performed to measure how many ions would hit a particular wafer 17 as a function of time. For example, where a $^{243}$Am source is used to make $^{239}$Np recoils which decay to plutonium, as described below, the assembly 10 is run under a carefully controlled set of conditions. Then, it is determined radiometrically how much $^{239}$Np there is on the wafer 17. This calibration can then be used to produce other wafers 17 without resorting to recalibration. That is, if a certain recoil thickness is made on a wafer 17 in 10 minutes, a corresponding doubled recoil thickness would be expected when the irradiation occurs for 20 minutes.

Furthermore, the production of uniform $^{235}$U, $^{237}$Np, $^{238}$U and $^{239}$Pu deposits as described herein simplifies the track counting enormously. At present, quantitative track counting over non-uniform deposits is required. With this new method, only sampling of the uniform track density is required.

An alternate embodiment directed to producing $^{237}$Np will now be described.

$^{237}$Np is produced by the decay of $^{241}$Am as follows:

$$^{241}\text{Am} \xrightarrow[458y]{\alpha} {}^{237}\text{Np} \tag{9}$$

The alpha particles emitted by $^{241}$Am have an energy of 5.49 MeV. Using Equation (2):

$$\text{Recoil Energy} = (4/237)(5.49 \text{ MeV}) \tag{10}$$

$$= 9.27 \times 10^{-2} \text{ MeV} \tag{11}$$

-continued $$= 92.7 \text{ keV} \tag{12}$$

As a result, each $^{241}$Am decay yields a 5.49 MeV alpha particle accompanied by a 92.7 keV $^{237}$Np recoil. If a thin deposit of $^{241}$Am is placed in a vacuum, about 50% of the decays will result in a $^{237}$Np recoil into the vacuum. If a substrate is placed in the vacuum adjacent to the $^{241}$Am source as described above, recoil $^{237}$Np ions will be implanted in the surface of the substrate resulting in an ultralow-mass deposit of $^{237}$Np.

By again using an extrapolation of the range-energy tables cited above, the recoil range of 92.7 keV $^{237}$Np ions is estimated to be about 10 $\mu$g/cm$^2$. Thus, a 10 $\mu$g/cm$^2$ layer of $^{241}$Am would retain about 50% of its recoils, so that an effective maximum thickness of an $^{241}$Am layer can be about 5 $\mu$g/cm$^2$. For a 10 cm diameter layer of $^{241}$Am with a thickness greater than the range of the $^{237}$Np recoils, the number of $^{237}$Np recoils that would escape from the $^{241}$Am layer is:

$$\frac{\pi(5 \text{ cm}^2)(5 \times 10^{-6} \text{ g/cm}^2)(6.022 \times 10^{23} \text{ atoms/mole})}{(241 \text{ g/mole})} \times$$

$$\frac{(0.693)}{(458)(365.25)(24)(3600)} \text{ (sec}^{-1})$$

$$= 4.71 \times 10^7 \text{ ions/sec} \tag{13}$$

$$= 4.07 \times 10^{12} \text{ ions/day} \tag{14}$$

For a substrate at a distance of 5 cm from this $^{241}$Am source, roughly $1.3 \times 10^{10}$ $^{237}$Np ions/cm$^2$/day would be implanted.

The mass requirement for a $^{237}$Np mid-plane reactor cavity solid state track recorder neutron dosimeter is $6.3 \times 10^{-11}$ gram. This deposit is typically spread over an area with a diameter of $\frac{1}{4}$ in. The resulting atomic density of the deposit is $5.05 \times 10$ atoms/cm$^2$ of $^{237}$Np. The time required to produce a deposit with this thickness is:

$$\frac{5.05 \times 10^{11} \text{ atoms/cm}^2}{1.3 \times 10^{10} \text{ ions/cm}^2/\text{day}} = 39 \text{ days} \tag{15}$$

As stated above, soild state track recorder neutron dosimeters typically have an overall diameter of 1.1 cm. About 25-50 solid state track recorders can be simultaneously irradiated adjacent to a $^{241}$Am source with a 10 cm diameter. An arrangement such as that shown in FIG. 1 and described above is used.

An alternate embodiment directed to producing $^{238}$U will now be described.

$^{238}$U is produced by the decay of $^{242}$Pu as follows:

$$^{242}\text{Pu} \xrightarrow[3.763 \times 10^5 y]{\alpha} {}^{238}\text{U} \tag{16}$$

The alpha particles emitted by $^{242}$Pu have an energy of 4.90 MeV. Using Equation (2):

$$\text{Recoil Energy} = (4/242)(4.90 \text{ MeV}) \tag{17}$$

$$= 8.10 \times 10^{-2} \text{ MeV} \tag{18}$$

$$= 81.0 \text{ keV} \tag{19}$$

As a result, each $^{242}$Pu decay yields a 4.90 MeV alpha particle accompanied by an 81.0 keV $^{238}$U recoil. If a thin deposit of $^{242}$Pu is placed in a vacuum, about 50% of the decays will result in a $^{238}$U recoil into the vacuum. If a substrate is placed in the vacuum adjacent to the $^{242}$PU source as described above, recoil $^{238}$U ions will be implanted in the surface of the substrate resulting in an ultralow-mass deposit of $^{238}$U.

By again using an extrapolation of the range-energy tables cited above, the recoil range of 81.0 keV $^{238}$U ions is estimated to be about 10 μg/cm². Thus, a 10 μg/cm² layer of $^{242}$Pu would retain about 50% of its recoils, so that an effective maximum thickness of a $^{242}$Pu layer would be about 5 μg/cm². For a 10 cm diameter layer of $^{242}$Pu with such a thickness greater than the range of $^{238}$U recoils, the number of $^{238}$U recoils that would escape from the $^{242}$Pu layer is:

$$\frac{\pi(5 \text{ cm}^2)(5 \times 10^{-6} \text{g/cm}^2)(6.022 \times 10^{23} \text{ atoms/mole})}{(242 \text{ g/mole})} \times$$

$$\frac{(0.693)}{(3,763 \times 10^5)(365.23)(24)(3600)} \text{ (sec}^{-1}\text{)}$$

$$= 5.70 \times 10^4 \text{ ions/sec} \quad (20)$$

$$= 4.93 \times 10^9 \text{ ions/day} \quad (21)$$

For a substrate at a distance of 5 cm from this $^{242}$Pu source, roughly $1.6 \times 10^7$ $^{238}$U ions/cm²/day would be implanted.

The mass requirement for a $^{238}$U mid-plane reactor cavity solid state track recorder neutron dosimeter is $7.0 \times 10^{-10}$ gram. This deposit is typically spread over an area with a diameter of ¼ in. The resulting atomic density of the deposit is $5.59 \times 10^{12}$ atoms/cm² of $^{235}$U. The time required to produce a deposit with this thickness is:

$$\frac{5.59 \times 10^{12} \text{ atoms/cm}^2}{1.6 \times 10^7 \text{ ions/cm}^2/\text{day}} = 3.56 \times 10^5 \text{ days} \quad (22)$$

Although such a time requirement is larger than practical for production of reactor cavity dosimeters, the production of dosimeters for higher fluence applications where the flux is a factor of $10^3$ to $10^5$ higher than in the reactor cavity is clearly feasible.

As stated above, solid state track recorder neutron dosimeters typically have an overall diameter of 1.1 cm. About 25–50 solid state track recorders could be simultaneously irradiated adjacent to a 10 cm diameter $^{242}$Pu source. An arrangement such as that shown in FIG. 1 and described above could be used.

A still further embodiment directed to producing $^{239}$Pu will now be described.

$^{239}$Pu is produced by the decay of $^{243}$Am as follows:

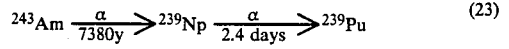
$$^{243}\text{Am} \xrightarrow[7380y]{\alpha} {}^{239}\text{Np} \xrightarrow[2.4 \text{ days}]{\alpha} {}^{239}\text{Pu} \quad (23)$$

The alpha particles emitted by $^{243}$Am have an energy of 5.28 MeV. Again, using Equation (2):

$$\text{Recoil Energy} = (4/239)(5.28 \text{ MeV}) \quad (24)$$

$$= 8.84 \times 10^{-2} \text{MeV} \quad (25)$$

$$= 88.4 \text{ keV} \quad (26)$$

As a result, each $^{243}$Am decay yields a 5.28 MeV alpha particle accompanied by an 88.4 keV $^{239}$Np recoil. If a thin deposit of $^{243}$Am is placed in a vacuum, about 50% of the decays will result in a $^{239}$Np recoil into the vacuum. If a substrate is placed in the vacuum adjacent to the $^{243}$Am source as described above, recoil $^{239}$Np ions will be implanted in the surface of the substrate. These $^{239}$Np atoms will, over a period of weeks, all decay to $^{239}$Pu resulting in an ultralow-mass deposit of $^{239}$Pu.

By again using an extrapolation of the range-energy tables cited above, the recoil range of 88.4 keV $^{239}$Np ions is estimated to be about 10 μg/cm². Thus, a 10 μg/cm² layer of $^{243}$Am would retain about 50% of its recoils or the effective maximum thickness of a $^{243}$Am layer is about 5 μg/cm². For a 10 cm diameter layer of $^{243}$Am with a thickness greater than the range of the $^{239}$Np recoils, the number of $^{239}$Np recoils that would escape from the $^{243}$Am layer is:

$$\frac{\pi(5 \text{ cm}^2)(5 \times 10^{-6} \text{ g/cm}^2)(6.022 \times 10^{23} \text{ atoms/mole})}{(243 \text{ g/mole})} \times$$

$$\frac{(0.693)}{(7380)(365.25)(24)(3600)} \text{ (sec}^{-1}\text{)}$$

$$= 2.90 \times 10^6 \text{ ions/sec} \quad (27)$$

For a substrate at a distance of 5 cm from this source, roughly $9.2 \times 10^3$ $^{239}$Np ions/cm²/day would be implanted.

As stated previously, the mass requirement for a $^{239}$Pu mid-plane reactor cavity solid state track recorder neutron dosimeter is $8.9 \times 10^{-14}$ gram. This deposit is typically spread over an area with a diameter of ¼ in. The resulting atomic density of the deposit is $7.08 \times 10^8$ atoms/cm² of 239Pu. The time required to produce a deposit with this thickness is:

$$\frac{7.08 \times 10^8 \text{ atoms/cm}^2}{9.2 \times 10^3 \text{ ions/cm}^2 \text{ sec}} = 7.70 \times 10^4 \text{ sec} \quad (28)$$

$$= 21.3 \text{ hours} \quad (29)$$

As discussed above, solid state track recorder neutron dosimeters typically have an overall diameter of 1.1 cm. About 25–50 solid state track recorders could be simultaneously irradiated adjacent to a 10 cm diameter $^{243}$Am source. An arrangement such as that shown in FIG. 1 can be used.

After deposition, a deposit of for instance $8.9 \times 10^{-14}$ gram of $^{239}$Np has a beta or gamma activity of $4.59 \times 10^4$ dpm, allowing easy mass calibration as it decays to $^{239}$Pu.

When a solid state track recorder fissionable deposit is prepared by the method described above using a mica substrate, the recoiling ions are implanted to a depth of about $7 \times 10^{-3}$ μm. Since the alpha recoils are highly ionizing heavy ions, latent tracks are produced in the mica solid state track recorder. The bulk etch rate for mica in 49% hydrogen fluoride at room temperature is about 4.4 μm/hr. In an 8 second etch, tracks with breadths about equal to the ranges of the alpha recoils are produced. Although these tracks are not visible with an ordinary optical microscope, they can be observed with an electron microscope. Since the optical efficiency for perpendicularly incident heavy ions in mica is 100%, the number of recoil tracks observed is exactly equal to the number of recoil ions.

If an ion implanted mica solid state track recorder is exposed to neutrons, etched, and both the induced fission tracks and recoil ion tracks are counted, the fission rate in fissions per atom can be calculated from the following relationship:

$$\text{Fission rate} = \frac{\text{Number of fission tracks}/\epsilon}{\text{Number of recoil tracks}} \quad (30)$$

The quantity $\epsilon$ is the optical efficiency for mica ($\epsilon = 0.9875$ fission tracks/fission).

In practice, one might etch the fission tracks and recoil tracks under different conditions. For example, a very small area of the solid state track recorder might be removed with a punch and etched for eight seconds for scanning with an electron miscroscope. The remainder of the solid state track recorder would be etched for about ninety minutes to optimize the viewing of fission tracks. Recoil tracks would have very little contrast after a ninety minute etch and would be difficult to observe.

Alternatively, a set of etching conditions can be derived where the fission tracks and alpha recoil tracks are both developed for viewing after a single etch. The advantage of this approach is that each fission track could be correlated with a corresponding alpha recoil track to ensure that the fission has not arisen from contamination of the deposits. This requirement effectively lowers the background for the solid state track recorder substantially, since background tracks can be discriminated out of the total count.

The use of this method and apparatus for solid state track recorder neutron dosimetry has all of the advantages inherent in the alpha recoil ion implantation techniques discussed above. In addition, a single soild state track recorder dosimeter can be used as a permanent record of all of the information needed to calculate the neutron-induced fission rate. Both the number of fissions and number of atoms of the fissioning species are permanently stored as a track record in the solid state track recorder. In addition, the correlations of fission and recoil atom tracks can be used to discriminate against background events.

The permanent storage of all of the fission rate data as a track record in the solid state track recorder makes this invention particularly attractive for commercial nuclear power reactor surveillance measurements, where dosimetry records that span the reactor lifetime, about 40 years, are required by Nuclear Regulatory Commission regulations. Data storage and archiving are simplified enormously with this invention. In addition, as newer and more sophisticated methods of track analysis become available, the solid state track recorders prepared by this invention are available for a more detailed reanalysis, including analysis to higher statistical accuracy, if required.

This invention also makes possible the prospect of applying solid state track recorder neutron dosimetry to higher neutron fluence measurements. An application of immediate relevance would be the use of solid state track recorder neutron dosimeters in the pressure vessel surveillance capsules of operating commercial nuclear power reactors. Previous attempts at solid state track recorder neutron dosimetry in this location have not been fruitful because of formidable problems with high track densities resulting from inherent mass limitations in the electroplating methods used to produce fissionable deposits, dosimeter size limitations, and deposit uniformity. It is believed these problems can be overcome with the invention described herein.

In light of the above, the present invention has the following advantages over other methods:
(1) isotopic spiking methods are not needed;
(2) electrodeposition methods and the resulting high purity chemical requirements are not needed;
(3) uniform deposits can be made, whereas high deposit uniformity has not been achieved with electroplating methods;
(4) only the apparatus need be calibrated, and after calibration, the exposure time is proportional to deposit mass at a given substrate location;
(5) a solid state track recorder can be used to produce a permanent record;
(6) the masses of the $^{235}$U, $^{237}$Np, $^{238}$U and $^{239}$Pu deposits can be controlled precisely;
(7) the resulting material in the $^{235}$U, $^{237}$Np, $^{238}$U and $^{239}$Pu deposit is isotopically pure;
(8) extremely low masses are possible;
(9) the present invention is simpler and more economical than previous methods; and
(10) the present invention simplifies track counting significantly.

The foregoing is considered illustrative only of the principles of the invention. Further, since numerous modifications and changes will readily occur to those skilled in the art, it is not desired to limit the invention to the exact construction and operation shown and described. Accordingly, resort may be had to all suitable modifications and equivalents falling within the scope of the invention and the appended claims.

I claim:

1. A method for producing a permanent record for neutron dosimetry with a fissionable deposit of low mass, comprising the steps of:
   (a) implanting ions from a parent source into a substrate to form a low mass of a fissionable daughter on the substrate;
   (b) exposing the substrate to neutrons; and
   (c) etching the substrate.

2. The method as recited in claim 1, wherein step (a) comprises the substeps of:
   (i) spacing in opposing relation the substrate and the parent source which decays into the fissionable daughter, and
   (ii) holding the parent source until the parent source decays to form the low-mass of the fissionable daughter on the substrate.

3. The method as recited in claim 2, further comprising the step of:
   (d) rotating the parent source relative to the substrate to uniformly deposit the fissionable daughter on the substrate.

4. The method as recited in claim 1, wherein step (a) further comprises the substep of:
   selecting the parent source from the group consisting of $^{239}$Pu, $^{241}$Am, $^{242}$Pu and $^{243}$Am.

5. The method as recited in claim 1, wherein step (a) comprises the substep of selecting the parent source so that the fissionable daughter is $^{239}$Pu.

6. The method as recited in claim 1, wherein step (a) comprises the substep of selecting the parent source so that the fissionable daughter is $^{235}$U.

7. The method as recited in claim 1, wherein step (a) comprises the substep of selecting the parent source so that the fissionable daughter is $^{237}$Np.

8. The method as recited in claim 1, wherein step (a) comprises the substep of selecting the parent source so that the fissionable daughter is $^{238}$U.

9. An apparatus for producing a low-mass fissionable deposit for neutron dosimetry, comprising:
   (a) a first surface including an alpha particle emitting parent source; and
   (b) a second surface including a mica substrate in opposing, spaced relation from the parent source, wherein the mica substrate is uniformly implanted with alpha recoils from the parent source.

10. The apparatus as recited in claim 9, wherein the first and second surfaces are rotatable relative to each other in a vacuum.

11. The apparatus as recited in claim 10, wherein the mica substrate comprises a plurality of solid state track recorder wafers, each rotatable relative to the first surface.

12. A method for forming a permanent record for neutron fluence measurements using a low mass of a fissionable isotope, comprising the steps of:
   (a) implanting ions of the fissionable isotope into a solid state track recorder;
   (b) exposing the implanted solid state track recorder to a neutron flux for a time period for which the fluence is to be measured; and
   (c) etching at least the exposed, implanted solid state track recorder to allow separately counting the tracks therein of each implanted ion of the fissionable isotope and of each fission of fissionable isotope caused by the neutron flux.

13. The method as recited in claim 12, wherein step (c) further comprises the substep of separately etching at least two parts of said solid state track recorder to allow counting in at least a portion of a first of the parts, the track of each implanted ion of the fissionable isotope, and in at least a portion of the second part, the track of each fission of the fissionable isotope caused by the neutron fluence.

14. A method of using the permanent record produced by the method of claim 12, further comprising the step of determining a value corresponding to the neutron fluence from the counted numbers of tracks of the implanted ions and the fissions.

15. A method of using the permanent record produced by the method of claim 13, further comprising the step of determining a value corresponding to the neutron fluence from the counted numbers of tracks of the implanted ions and the fissions.

16. The method of claim 12, wherein the etching of step (c) is provided to allow visual correlation of each track of a fission of the fissionable isotope.

17. A method for using the permanent record produced by the method of claim 16, wherein any tracks in said implanted, exposed solid state track recorder due to background are discriminated against and excluded from the counting on the basis of there being no correlation between a track due to implantation and a track due to fission, and the value of the neutron flux is accordingly determined without error due to such background.

18. The method of claim 12, comprising the substep of selecting the solid state track recorder from the group consisting of mica, quartz and zircon.

19. The method of claim 12, wherein the implanting of step (a) is provided by locating the solid state track recorder in a vacuum opposite a parent source that alpha-decays to eject as a daughter each ion of the fissionable isotope implanted in the solid state track recorder.

* * * * *